Patented July 29, 1952

2,605,227

UNITED STATES PATENT OFFICE 2,605,227

CADMIUM PHOSPHATE PHOSPHORS

Gorton R. Fonda, Schenectady, N. Y., assignor to General Electric Company, a corporation of New York No Drawing. Application August 5, 1950, Serial No. 177,975

17 Claims. (Cl. 252—301.6)

This invention relates to luminescent materials. More particularly it relates to luminescent materials having good brightness and resistance to loss of brightness under cathode ray bombardment, which are also useful in fluorescent lamps.

It has been known heretofore that luminescent materials may be prepared by firing certain phosphates and a manganese salt in air. For example, when precipitated cadmium phosphate and a manganese salt are fired in air, a phosphor results which emits an orange-red fluorescence. While the fluorescence is rather weak under 2537 Å. excitation, it is moderately strong under cathode rays under which bombardment it has a good brightness maintenance.

It is an object of this invention to provide new phosphors of the phosphate type which are characterized by improved brightness under cathode ray bombardment.

Another object of the present invention is to provide phosphors of the phosphate type which have superior brightness maintenance under continual cathode ray excitation.

A further object of the invention is to provide a method for preparing phosphors of the present type.

It has been found that new and useful phosphorescent materials may be prepared by firing in an atmosphere of hydrogen and steam mixtures of precipitated cadmium phosphate with various oxides or other phosphates along with activating proportions of manganese to produce double phosphate salts. Since the cadmium phosphate and oxide or other phosphate are used in equimolar quantities, the resulting double salts contain equimolar parts of cadmium and the metal of the added oxide or phosphate.

More particularly, it has been found that superior phosphors may be prepared by firing in a hydrogen-steam atmosphere mixtures of precipitated cadmium phosphate with oxides or phosphates of magnesium, calcium, and cadmium along with manganese activator.

While ordinary cadmium orthophosphate may be used in preparing the phosphors of the present invention, it is preferred to use a precipitated cadmium phosphate which is probably a mixture of the orthophosphate with the acid phosphate, containing also some water of crystallization.

This precipitated cadmium phosphate may be prepared, for example, by adding a hot solution of diammonium hydrogen phosphate to a hot solution of a cadmium salt, such as the sulfate. Other methods will occur to those skilled in the art.

The hydrogen-steam atmosphere used in connection with this invention is provided by passing hydrogen over water at or near the boiling point.

Example I

Equimolar parts of precipitated cadmium phosphate and cadmium oxide are powdered and thoroughly mixed together with enough of powdered manganese phosphate to yield about one per cent by weight of manganese. Other compounds of manganese which may be typically used are the carbonate and oxide. The mixture is fired in an atmosphere of hydrogen and steam at a temperature of 800° C. to 900° C. for about one hour. The firing temperature in this as well as the following examples may also range from 700° C. to 1000° C. and the firing time from about one-half to three hours, it being understood that shorter firing times should be employed at the higher temperatures and longer times at the lower temperatures within the above limits. The resulting phosphor material fluoresces red under 2537 Å. and cathode ray (CR) excitation. The brightness of the material is considerably brighter than a phosphor similarly prepared from precipitated cadmium phosphate alone.

Example II

Equimolar parts of precipitated cadmium phosphate and calcium oxide are powdered and thoroughly mixed together with one per cent by weight manganese in the form of the powdered phosphate. The mixture is fired in a hydrogen-steam atmosphere for about one hour at 800° C. to 900° C. The phosphor fluoresces a bright yellow under excitation by 2537 Å. and cathode rays.

Example III

Equimolar parts of precipitated cadmium phosphate and magnesium oxide and enough manganese phosphate to provide one per cent by weight of manganese are powdered and mixed thoroughly together. The ingredients are then fired in a hydrogen-steam atmosphere at 800° C. to 900° C. for about one hour. The phosphor thus prepared has a red emission under 2537 Å. and cathode ray excitation.

Example IV

Equimolar parts of precipitated cadmium phosphate and calcium hydrogen phosphate are powdered and thoroughly mixed along with enough manganese phosphate to yield one per cent by weight of manganese. The mixture is then fired at about 800° C. to 900° C. for about one hour. The phosphor fluoresces a bright yellow under 2537 Å. and cathode ray excitation. Magnesium hydrogen phosphate may be used in lieu of the calcium hydrogen phosphate.

As pointed out above, while the preferred times and temperature of firing are about one hour at 800° C. to 900° C. the materials may be fired at from about 700° C. to 1000° C. for times ranging from one-half to three hours depending on the particular temperature employed. Likewise, while manganese phosphate is used in the above examples, other compounds of manganese such as the carbonate and oxide, among others, may be used to provide the requisite quantity of activating manganese. While one per cent by weight of manganese is preferred, from about one-half to three per cent may be used without detracting from the properties of the phosphor.

Phosphors prepared according to the present invention are characterized by a much greater brightness under 2537 Å. and cathode ray excitation than when they are fired in air. The wavelength of the color emitted is also shifted toward the red by firing in a hydrogen-steam atmosphere.

While the greater brightness of the present phosphors is of decided advantage, they are even more particularly characterized by their enhanced maintenance of brightness under continual cathode ray bombardment or excitation. As a test of this property, various phosphors were subjected to a twenty-kilovolt cathode ray beam of high current density for five minutes under identical values of current density and other conditions. The brightness of each phosphor was measured before and after exposure and the per cent loss in brightness noted. A phosphor prepared by firing precipitated cadmium phosphate with about one per cent of manganese in air with other conditions as in the present invention lost nine per cent of its brightness during the test. On the other hand, the phosphor of Example I above lost only four per cent of its brightness; that of Example II, three per cent; that of Example III, five per cent; and that of Example IV, none. A consideration of the above results will at once make apparent the superiority of the present phosphors.

X-ray analysis of the new and useful phosphors of this invention has shown them to be the double salt of the phosphates of the two metals present.

There are provided herein luminescent materials whose brightness is similar to that of the well-known zinc beryllium silicate phosphor and whose maintenance of brightness under continuous cathode ray bombardment is noteworthy.

What I claim as new and desire to secure by Letters Patent of the United States is:

1. A luminescent material consisting of the double salt of cadmium phosphate and a phosphate of another metal selected from the group consisting of magnesium and calcium and activated with one-half to three percent by weight of managanese, said double salt containing equimolar parts of cadmium and said other metal.

2. A luminescent material consisting of the double salt of cadmium phosphate and calcium phosphate and activated with one-half to three percent by weight of manganese, said double salt containing equimolar parts of cadmium and calcium.

3. A luminescent material consisting of the double salt of cadmium phosphate and magnesium phosphate and activated with one-half to three percent by weight of manganese, said double salt containing equimolar parts of cadmium and magnesium.

4. The method of preparing a luminescent material which comprises mixing equimolar parts of precipitated cadmium phosphate and a hydrogen phosphate of a metal selected from the group consisting of magnesium and calcium along with one-half to three percent by weight of manganese activator, and firing in a hydrogen-steam atmosphere for about one-half to three hours at 700° C. to 1000° C.

5. The method of preparing a luminescent material which comprises mixing equimolar parts of precipitated cadmium phosphate and magnesium hydrogen phosphate along with one-half to three percent by weight of manganese activator and firing in a hydrogen-steam atmosphere for about one-half to three hours at 700° C. to 1000° C.

6. The method of preparing a luminescent material which comprises mixing equimolar parts of precipitated cadmium phosphate and calcium hydrogen phosphate along with one-half to three percent by weight of manganese activator and firing in a hydrogen-steam atmosphere for about one-half to three hours at 700° C. to 1000° C.

7. The method of preparing a luminescent material which comprises mixing equimolar parts of precipitated cadmium phosphate and a hydrogen phosphate of a metal selected from the group consisting of magnesium and calcium along with one-half to three percent by weight of manganese activator and firing in a hydrogen-steam atmosphere for about one hour at 800° C. to 900° C.

8. The method of preparing a luminescent material which comprises mixing equimolar parts of precipitated cadmium phosphate and magnesium hydrogen phosphate along with one-half to three percent by weight of manganese activator and firing in a hydrogen-steam atmosphere for about one hour at 800° C. to 900° C.

9. The method of preparing a luminescent material which comprises mixing equimolar parts of precipitated cadmium phosphate and calcium hydrogen phosphate along with one-half to three percent by weight of manganese activator and firing in a hydrogen-steam atmosphere for about one hour at 800° C. to 900° C.

10. The method of preparing a luminescent material which comprises mixing equimolar parts of precipitated cadmium phosphate and magnesium oxide with one-half to three percent by weight of manganese activator and firing for about one-half to three hours at 700° C. to 1000° C.

11. The method of preparing a luminescent material which comprises mixing equimolar parts of precipitated cadmium phosphate and calcium oxide with one-half to three percent by weight of manganese activator and firing for about one-half to three hours at 700° C. to 1000° C.

12. The method of preparing a luminescent material which comprises mixing equimolar parts of precipitated cadmium phosphate and cadmium oxide with one-half to three percent by weight of manganese activator and firing for about one-half to three hours at 700° C. to 1000° C.

13. The method of preparing a luminescent material which comprises mixing equimolar parts of precipitated cadmium phosphate and magnesium oxide with one-half to three percent by weight of manganese activator and firing for about one hour at 800° C. to 900° C.

14. The method of preparing a luminescent material which comprises mixing equimolar parts of precipitated cadmium phosphate and calcium oxide with one-half to three percent by weight of manganese activator and firing for about one hour at 800° C. to 900° C.

15. The method of preparing a luminescent material which comprises mixing equimolar parts of precipitated cadmium phosphate and cadmium oxide with one-half to three percent by weight of manganese activator and firing for about one hour at 800° C. to 900° C.

16. The method of preparing a luminescent material which comprises mixing equimolar parts of precipitated cadmium phosphate and a material selected from the group consisting of a hydrogen phosphate and an oxide, said hydrogen phosphate being selected from the group consisting of calcium and magnesium hydrogen phosphate, said oxide being selected from the group consisting of cadmium oxide, magnesium oxide, and calcium oxide, along with one-half to three percent by weight of manganese activator and firing in a hydrogen-steam atmosphere for about one-half to three hours at 700° C. to 1000° C.

17. The method of preparing a luminescent material which comprises mixing equimolar parts of precipitated cadmium phosphate and a material selected from the group consisting of a hydrogen phosphate and an oxide, said hydrogen phosphate being selected from the group consisting of calcium and magnesium hydrogen phosphate, said oxide being selected from the group consisting of cadmium oxide, magnesium oxide, and calcium oxide, along with one-half to three percent by weight of manganese activator and firing in a hydrogen-steam atmosphere for about one hour at 800° C. to 900° C.

GORTON R. FONDA.

REFERENCES CITED

The following references are of record in the file of this patent:

UNITED STATES PATENTS

| Number | Name | Date |
| --- | --- | --- |
| 2,434,764 | Froelich | Jan. 20, 1948 |
| 2,471,082 | Schulman | May 24, 1949 |